C. HEINTZE.
VIBRATION MASSAGE INSTRUMENT.
APPLICATION FILED OCT. 8, 1915.
1,175,262.
Patented Mar. 14, 1916.
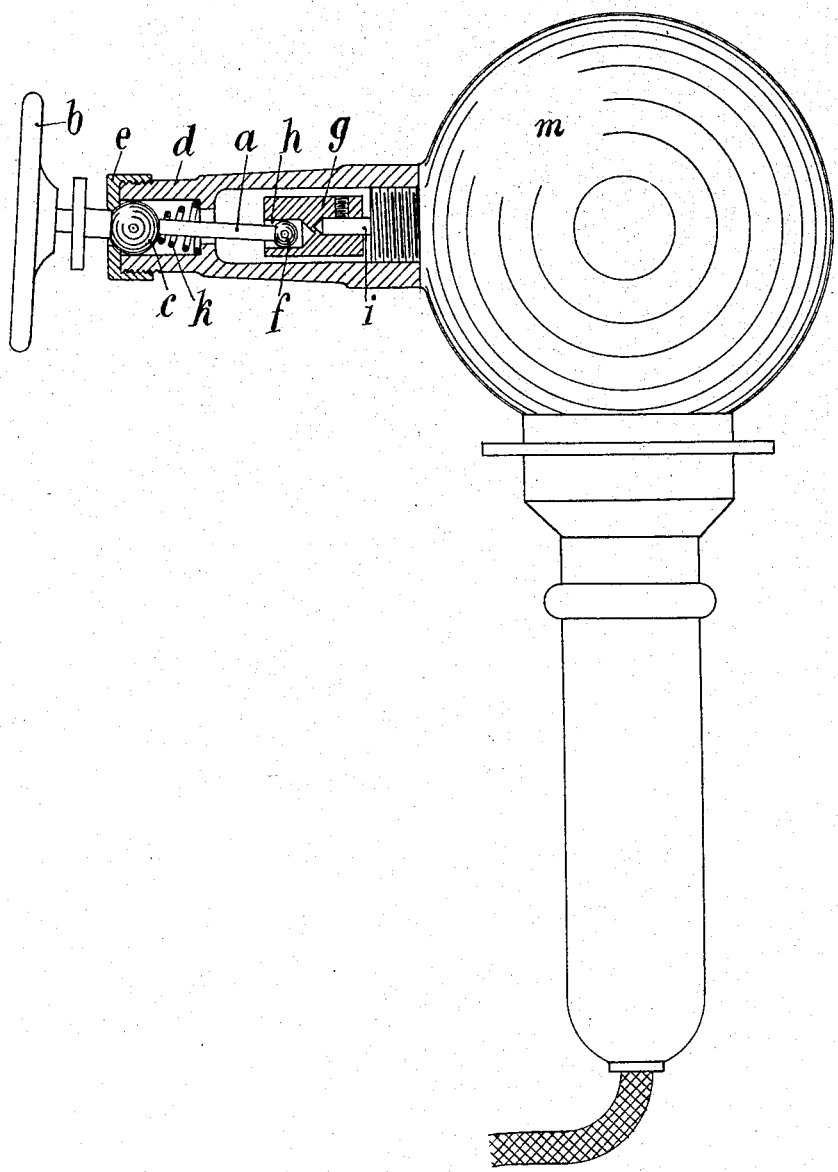
C. Heintze.
Inventor.

UNITED STATES PATENT OFFICE.

CONRAD HEINTZE, OF BERLIN, GERMANY, ASSIGNOR TO THE FIRM OF ELECTRICITÄTS-GESELLSCHAFT "SANITAS" M. B. H., OF BERLIN, GERMANY.

VIBRATION MASSAGE INSTRUMENT.

1,175,262. Specification of Letters Patent. Patented Mar. 14, 1916.

Application filed October 8, 1915. Serial No. 54,862.

*To all whom it may concern:*

Be it known that I, CONRAD HEINTZE, engineer, a subject of the King of Prussia, and residing at 15 Holsteiner Ufer, Berlin, Germany, have invented certain new and useful Improvements in Vibration Massage Instruments, of which the following is a specification.

The present invention relates to a vibration massage instrument in which the vibrating body or applicator, performing a rotary pendulating movement, is journaled in a ball joint. With other known instruments of this kind the ball of the ball joint is journaled in a corresponding spherical metallic dish. In such case, owing to rapid wear caused by the high speed, a loud noise will very soon appear, which renders the instrument unsuitable for its purpose. For this reason the dish has been lined with leather, but this results in very high frictional resistances, which form a heavy load for the driving motor, which, for instruments of this kind, should be constructed as light as possible.

According to the present invention, with the object of reducing frictional resistances as well as noises to a minimum, the bearing part of the vibration body is, at the rear, elastically supported by means of a spring of small initial tension acting contrary to the massaging pressure, so that, in the absence of a massaging pressure, such part will by the said spring be held up against the front bearing face in the ball joint, and will under action of the massaging pressure lift off from this bearing face, so that there will be no gliding friction on the same. The said spring will, besides, solely by elastic deformation and without gliding friction take up the movements of the bearing part of the vibrating body and, at the same time, prevent all knocking of this part if, in consequence of its having worn, it no more bears closely against its guide surfaces at the sides.

In the accompanying drawing a constructional form of the invention is exemplified.

The lever $a$, to the outer end of which a massaging tool $b$ is fitted, is formed intermediate its ends with a ball $c$ forming its bearing part; this ball is housed within a cylindrically bored sleeve $d$ which is closed by a cap $e$. At its rear end the said lever is formed with a second ball $f$ which engages in an eccentric cylindrical bore $h$ in the crank head $g$ fitted to the shaft $i$ of the driving motor $m$. In the sleeve $d$ is disposed a conically wound spring $k$ which, at the one end, bears against the bottom of the said sleeve $d$, at the other end against the ball $c$. By the action of spring $k$ the ball will be held up against the seat in cap $e$, when the instrument is running idle, or, in other words, when no pressure is acting on the tool $b$. As the spring $k$ has, however, a small initial tension, the friction caused thereby will be very small. When, however, the tool $b$ is applied with pressure against a part of the body, the ball $c$ will be displaced against the action of spring $k$, in such a manner, that it is lifted off the seat in cap $e$, so that no gliding friction whatever will occur at this point. The entire pressure will be taken up by the spring $k$, but neither here any gliding friction will be caused, as the oscillations of the spring will be taken up by elastic deformations. There will be only a small friction between the surface of the ball $c$ and the cylindrical inner side of sleeve $d$. This friction is, however, immaterial, because the frictional surfaces in question only act as guides and do not receive the working pressure.

Owing to almost absolute absence of all gliding friction and to its being replaced by elastic and thus energy returning deformations of the spring, the instrument will consume but very little power; furthermore the wear will be very small, so much the more as the wear which will occur on the cylindrical surfaces of the bores of sleeve $d$ and the crank head $g$, respectively, will be distributed, in consequence of the elastic journaling, over comparatively wide circumferential bands.

I claim:

1. In a vibration massage instrument, the combination of an applicator comprising a ball; a spring of small initial tension bearing against said ball in a direction opposite to the massaging pressure; a bearing surface on which said ball is applied by the said spring in the absence of a massaging pressure; a cylindrical guiding surface for said ball; and means to impart a movement to the axis of said applicator in a cone-shaped path to cause a wabbling movement of the applicator.

2. In a vibration massage instrument, the combination of an applicator comprising a ball; a spring of small initial tension bearing against said ball in a direction opposite to the massaging pressure; a bearing surface on which said ball is applied by the said spring in the absence of a massaging pressure; a cylindrical guiding surface for said ball; a driving shaft; a crank on said shaft; a cylindrical bore in said crank; and a ball at the rear end of said applicator lodged in said bore.

3. In a vibration massage instrument, the combination of an applicator comprising a ball; a conically wound spring of small initial tension bearing against said ball in a direction opposite to the massaging pressure; a bearing surface on which said ball is applied by the said spring in the absence of a massaging pressure; a cylindrical guiding surface for said ball; a driving shaft; a crank on said shaft; a cylindrical bore in said crank; and a ball at the rear end of said applicator lodged in said bore.

In witness whereof I have hereunto set my hand in the presence of two witnesses.

CONRAD HEINTZE.

Witnesses:
 AUGUST TRAUTMANN,
 HENRY HASPER.

Copies of this patent may be obtained for five cents each, by addressing the "Commissioner of Patents, Washington, D. C."